Jan. 26, 1965 W. G. HARRISON ETAL 3,167,192
AUTOMATIC SORTATION SYSTEM
Filed Jan. 10, 1961 6 Sheets-Sheet 3

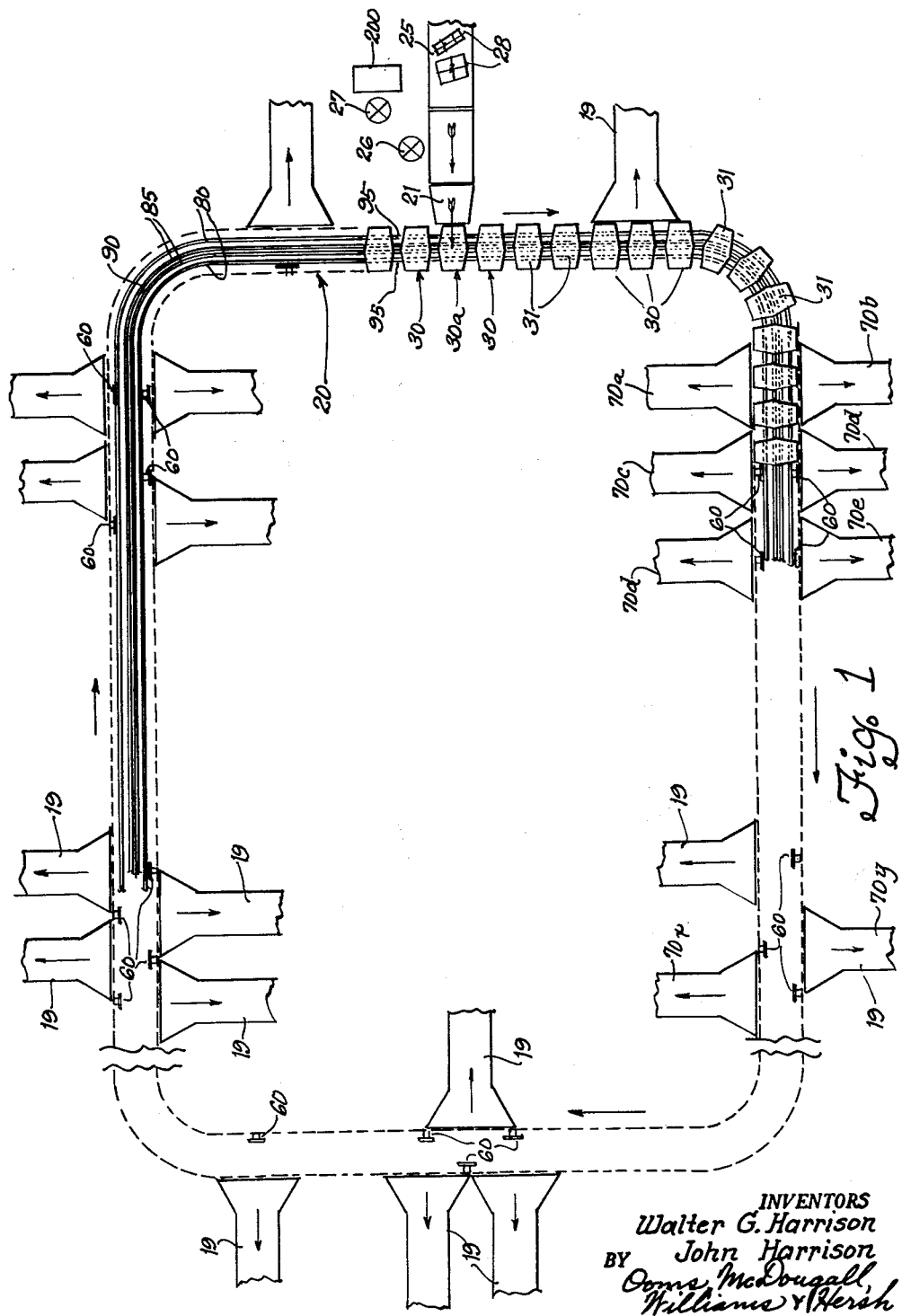

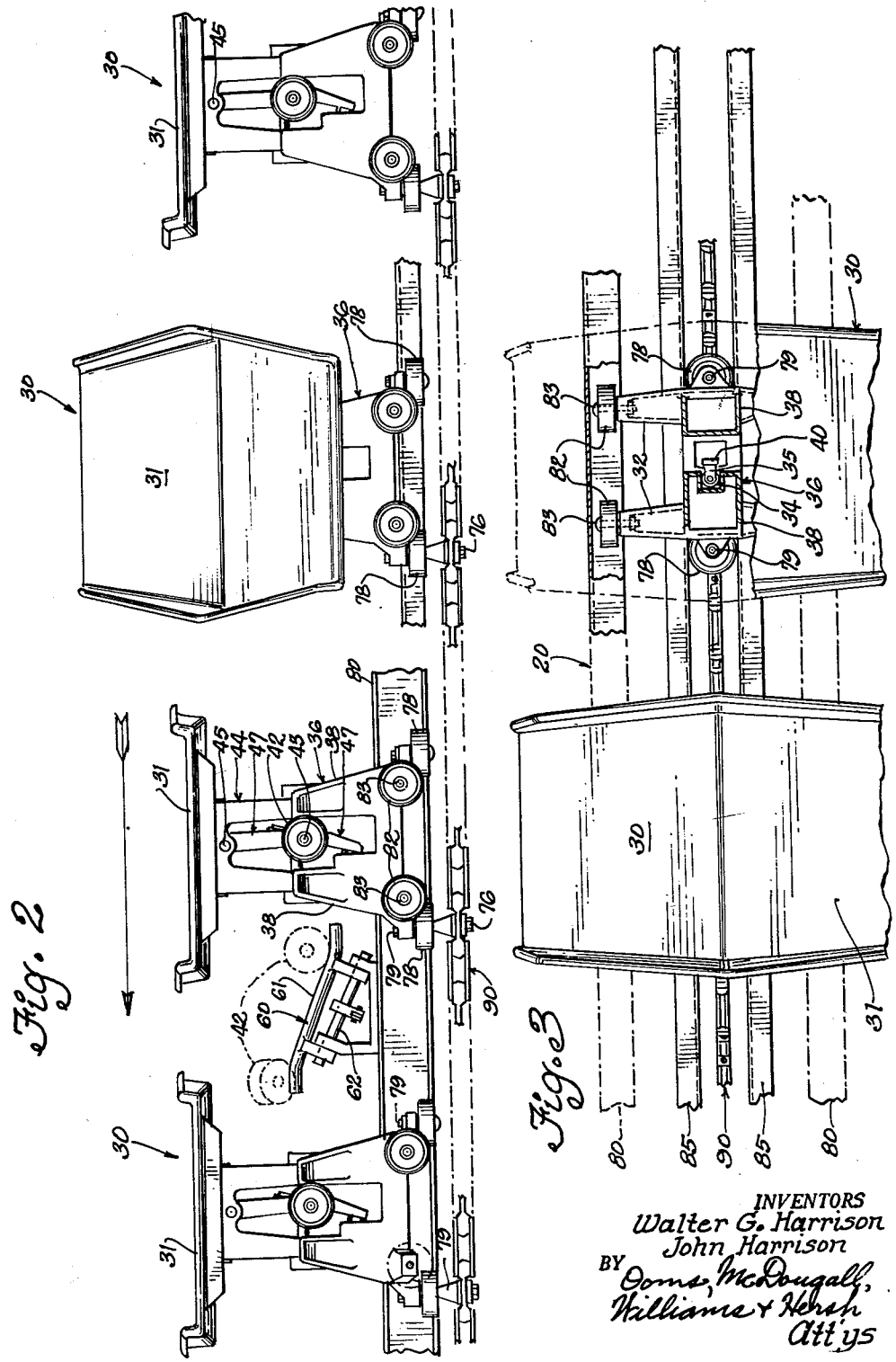

Fig. 4

INVENTORS
Walter G. Harrison
John Harrison
BY Dorns, McDougall,
Williams & Herik
Att'ys INVENTORS
Walter G. Harrison
John Harrison
BY
Att'ys

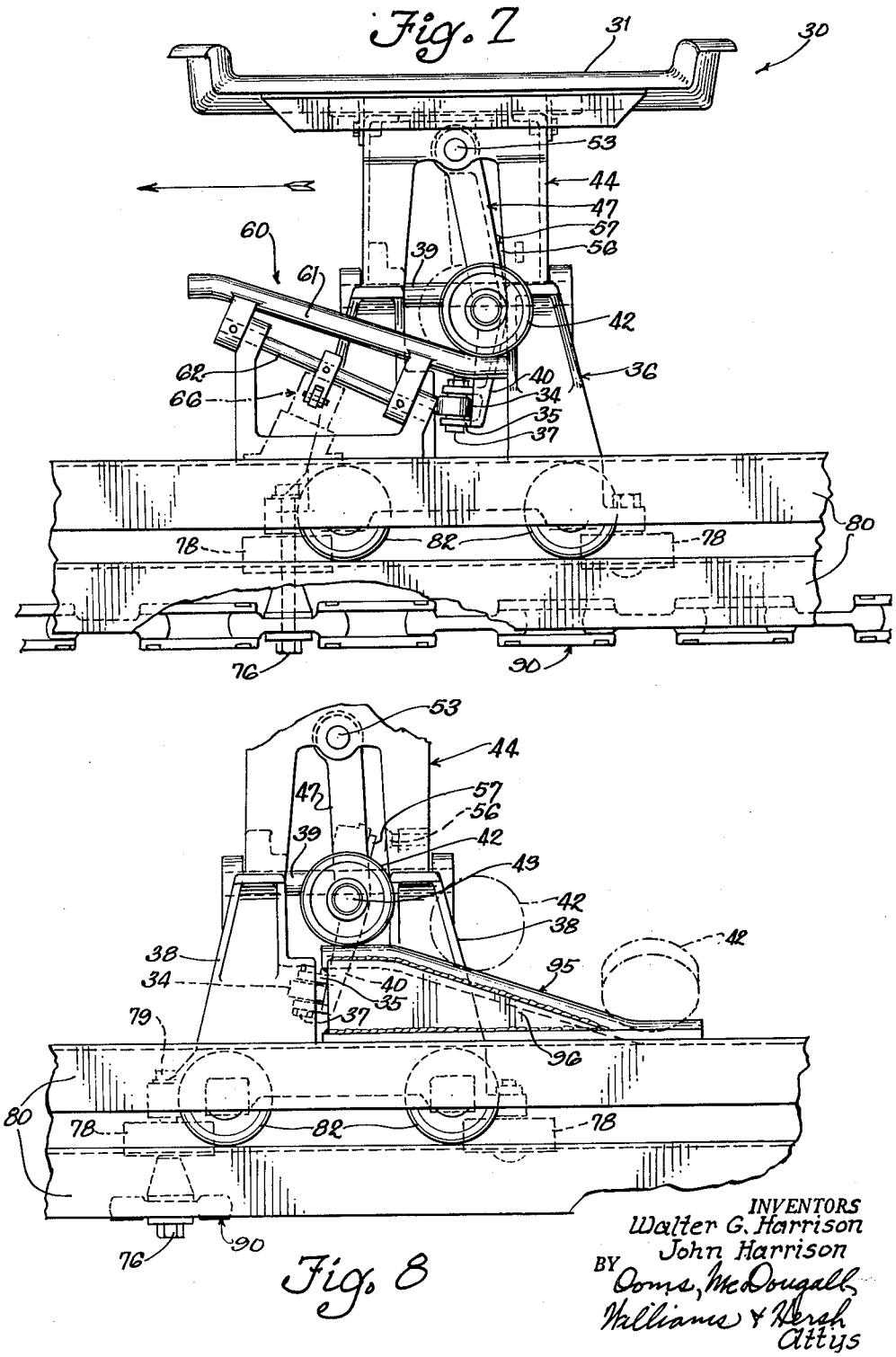

INVENTORS
Walter G. Harrison
John Harrison.

United States Patent Office 3,167,192
Patented Jan. 26, 1965

3,167,192
AUTOMATIC SORTATION SYSTEM
Walter G. Harrison, Westchester, and John Harrison, Lincolnwood, Ill., assignors, by mesne assignments, to Prospect Manufacturing Co. Inc., Chicago, Ill., a corporation of Illinois
Filed Jan. 10, 1961, Ser. No. 81,754
1 Claim. (Cl. 214—62)

This invention relates in general to conveying apparatus and more particularly to a system for selectively depositing conveyed items or objects along a conveyor route.

The provision of an economical versatile conveying arrangement for use in, for example, package sortation whereby packages are selectively delivered to respective stations or locations to which may be assigned respective postal zones, contemplates that articles may be deposited from the conveyor at stations on either side of the conveyor. This considerably reduces the linear distance required to accommodate a particular number of stations and in turn provides many economies in space and power.

In order to do this the present invention provides apparatus for conveying various articles or packages that is flexibly supported from a point moving relative to the respective locations or stations in the conveyor route. This apparatus can then be operated in either direction to deposit a package in a desired direction while it is being relatively moved.

In addition the present invention provides electrical apparatus common to a number of different locations or stations along the route whereby operation of the electrical apparatus in various combinations selects one station among the many and controls the conveying apparatus to secure the required deposition of an article at a predetermined station.

It is therefore an object of the present invention to provide an improved conveying system for use in sorting conveyed articles.

It is another object of this invention to provide improved conveyor apparatus which can be operated in any one of a plurality of directions to deposit an article while in movement.

It is still another object of this invention to provide an improved conveying system in which articles may be deposited on either side of a conveying route.

It is still another object of the present invention to provide an improved arrangement for electrically selecting stations at which respective conveyed articles are to be deposited.

It is still a further object of the present invention to provide improved apparatus for conveying articles to be selectively deposited along a conveyor route.

FIG. 1 is a schematic plan view showing the general arrangement of the conveying apparatus.

FIGS. 2 and 3 are respective side and top elevational views of portions of the conveyor apparatus shown in FIG. 1 and having certain portions thereof illustrated either in phantom or in section.

FIG. 4 is a sectional view of the conveying apparatus in FIG. 1 taken to illustrate the manner in which a carriage is returned to normal.

FIGS. 7 and 8 illustrate respective side views of the carriage to illustrate the manner in which the various components are controlled.

Figure 5:
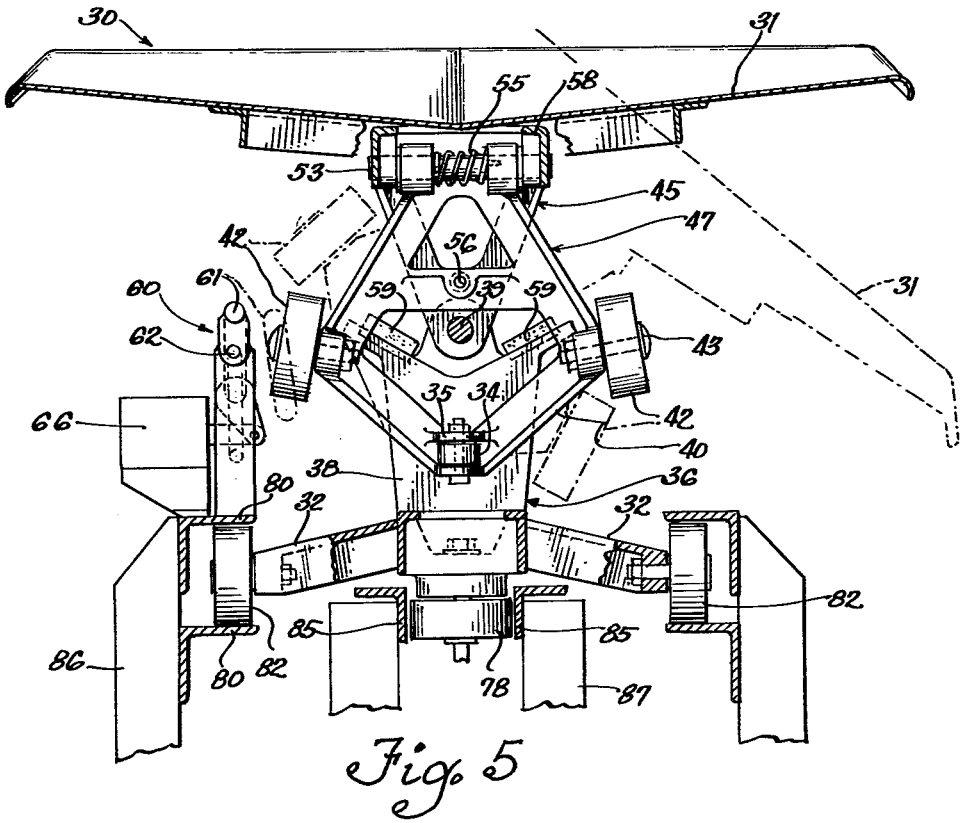
FIG. 5 and 6 are respective sectional views of the conveyor apparatus showing the manner in which the carriages are adapted to be operated or pivoted.

Referring now to FIG. 1 the sortation apparatus or conveyor system arranged in a carousel is generally indicated at 20. It comprises an endless chain 90 which drives a series of carriages 30 and 30a each having a tray 31, past a number of different stations in the direction of the arrow. The carriages 30 and 30a are appropriately supported and guided by the guide channels 80 and 85 as will be explained and are successively aligned with a feeding station 21. A belt 25 brings the incoming packages such as 28 of various sizes towards the feeding station 21 so that an attendant at 26 may conventionally mark the packages in accordance with the respective destinations and then move each package onto the tray 31 via the oblique section at station 21. The trays 31 are normally in a horizontal position and comprise a dished element of sufficient size to accommodate the largest package to be transported.

The stations are indicated at 70a–70x and are disposed as desired along the route of the conveying apparatus 20. The stations 70a–70x are arranged in successive positions on opposite sides of the conveyor 20 or in successive alternate positions opposite from each other and the receptacle 19 provided at each station may be arranged to automatically convey packages from the station to a respective ultimate location.

Figure 9:
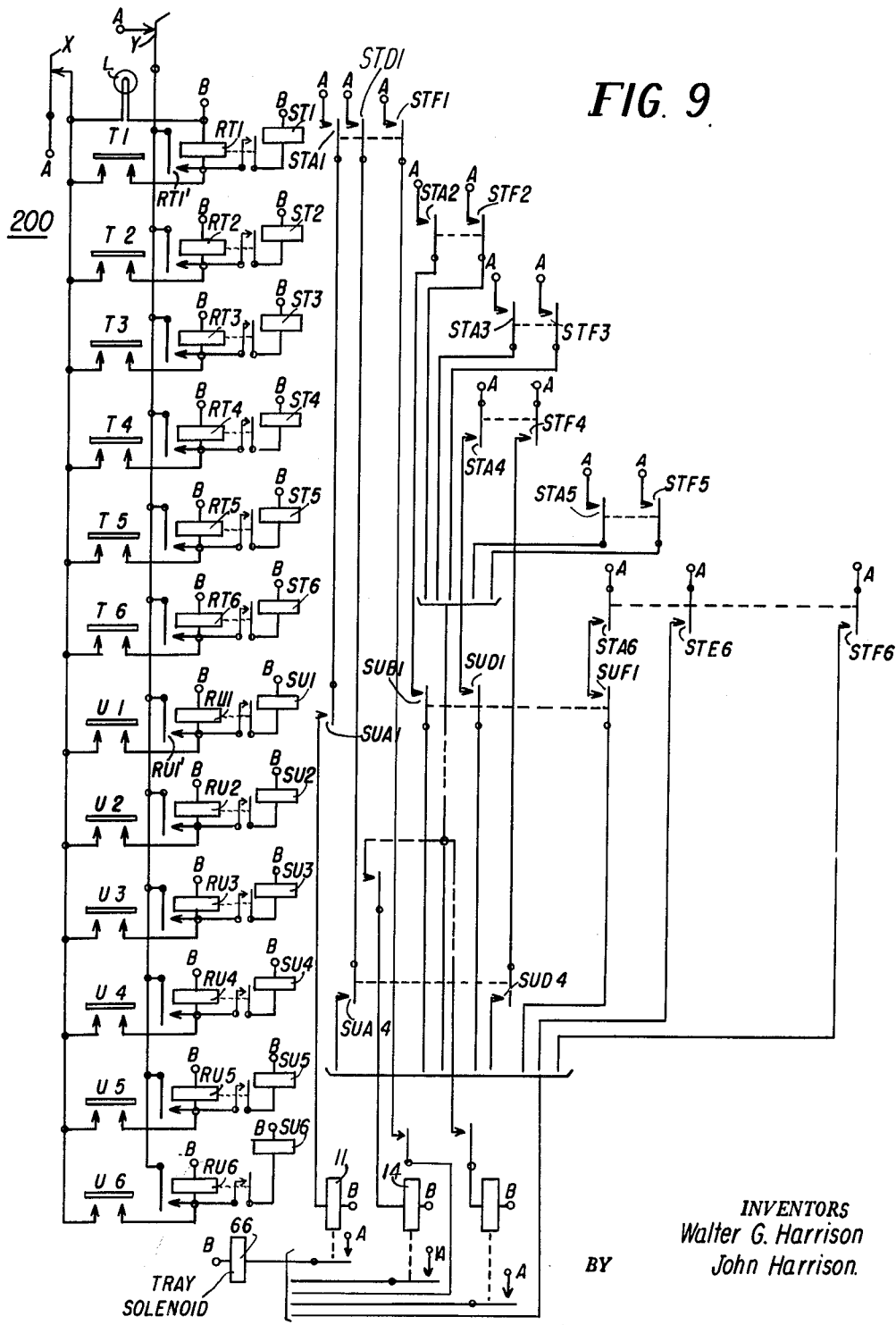
FIG. 9 illustrates one type of circuit arrangement by means of which the respective stations are selected.

In this arrangement the stations 70a–70x may represent various postal zones arranged in respective groups assigned the digits from 11–16, 21–26, 31–36, 41–46, 51–56 and 61–66 and/or other numbers. The attendant at 27 operates a tens and a units key T1–T6 and U1–U6 as seen in FIG. 9, at the keyboard 200 corresponding to the respective digits representing a postal zone corresponding to one of the stations 70a–70x at which the package is to be deposited. The operated keys prepare a pair of memory timers one individual to the tens digit of the desired station and one individual to the units digit of the same station.

These are of any well known type arranged to be stepped once each time the carirages 30 and 30a are moved one increment, which is selected as desired. Each memory timer, for example, may comprise the well known type of construction wherein each one of a series of balls may be successively dropped into a channel responsive to successive operations of a solenoid associated with each timer under control of a respective tens or units key. These balls may each be stepped through about 90 positions in the channel by a suitable lever operated on each step or incremental movement of the chain. Contacts may be placed at one or more selected positions adjacent the channel for operation by the respective balls when passing through those positions. Any ball in the channel is stepped preferably by arms positioned on the chain at locations corresponding to the respective trays responsive to each increment moved by the chain and trays. This brings any ball in the channel past a predetermined position corresponding to a desired station assigned to the memory timer. Contacts at that predetermined position are then closed for preparing a respective circuit to a solenoid at the desired station.

The circuit is completed responsive to the prepared tens and units timer at which respective balls are each stepped to a position corresponding to the desired station for operating the solenoid 66 individual to the station. Thereafter the ball at each timer is returned to its original conditions. Thus each different tens digit is assigned to an individual timer and each different units digit is assigned to an individual timer and by arranging the respective outputs in a matrix so that when the ball at the tens timer is stepped past positions corresponding to its tens digit and the units timer is stepped past corresponding positions, the conveyor will have moved the carriage 30 or 30a upon which the package 28 is loaded to the desired one of the stations 70a–70x at which that package is to be deposited. It will also be understood that alternatively one memory timer may be assigned to each station and when prepared responsive to the operation of a button at keyboard 200 it will sequentially count each conveyor step until the carriage upon which the package is deposited is abreast of the station and then operate the solenoid 66 to cause the deposit of the package at the station. This latter arrangement is well known.

The conveyor 20 is also provided with a motor (not shown) which steps the chain 90 and the carriages 30 and 30a through a caterpillar drive. The chain 90 or the carriages 30 are adapted to operate in any well known manner an arm (not shown) associated with each memory timer for stepping any ball in the aforementioned channel one step for each increment moved. Thus the carriages 30 and 30a are connected to the chain 90 in fixed positions and each time the chain 90 moves a desired step or segment the selected memory timers are operated to move a ball one step and when the ball has moved through a number of steps corresponding to various stations or locations assigned a memory timer, contacts at each of those positions are operated.

Figure 6:
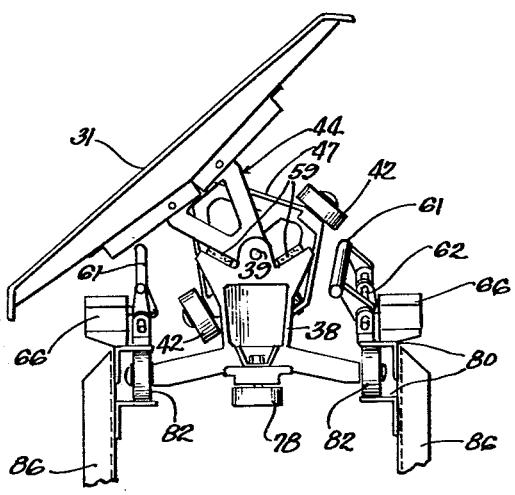

When the selected pair of memory timers have been operated to place a ball in the associated channel and those balls are each stepped to a position corresponding to the desired stations, the balls will each operate a contact. The contacts are arranged in the aforementioned matrix so that when both the tens and units contacts corresponding to one station are operated, a circuit is completed to a solenoid 66 seen in FIGS. 6 and 9, individual to the station at which the package is to be deposited. The carriage 30 or 30a is then opposite that station. The solenoid 66 operates the respective cam 60 to position it in the path of the carriage and thereafter the tray 31 on that carriage is pivoted to deposit the package 28 in the receptacle provided at the respective station. The solenoid and its associated tray relay to be described is then released as the respective balls step away from the contact operating position or they may be released alternatively either by a contact operated as the package is deposited or by the carriage as it disengages from the cam. As the carriage 30 or 30a proceeds around the conveyor, it encounters one of the restoring cams 95 which restores the tray 31 to its normal or horizontal position in preparation for the receipt of another package.

Referring now to FIGS. 2, 3 and 4 showing side, top and front views respectively of portions of the conveyor apparatus 20 and especially the carriages 30, it will be seen that each carriage comprises a U-shaped standard 36 which is supported by the horizontal leg members 32. The leg members 32 each carry a pair of rollers 82 pivotally mounted thereon at 83 and in turn supported between two horizontal legs of the pair of L-shaped channel members 80 on each side of the conveyor. The channel members 80 are suitably supported by the uprights 86.

The standard 36 also carries a pair of pivotally mounted horizontal rollers 78 adjacent the longitudinal axis of the conveyor and each is pivotally supported at the respective front and back of the standard 36 at pins 79. In addition one of the rollers 78 is connected at a specific point in the conveyor chain 90 at 76, and each roller 78 is adapted to ride between two vertical legs of the L-shaped channel members 85.

The channels 85 are supported by the vertical standards 87. Thus the carriage standards 36 are each moved along the conveyor route by chain 90 and each maintains a fixed position with respect thereto as the horizontal legs of channels 80 prevent vertical movement, while the vertical legs of channels 85 prevent horizontal movement.

The standard 36 comprises a pair of upright legs 38 with a U-shaped recess therebetween into which the pivot bar 47 is disposed as perhaps most clearly seen in FIGS. 5, 6, 7 and 8. The pivot bar 47 comprises a somewhat diamond shaped framework depnding in a plane transverse to the conveyor route from the pin 53 at one corner and having a pair of almost vertical rollers 42 mounted at opposite corners lying outside the standard 36. The pivot bar 47 is pivotally supported on pin 53 and biased by spring 55. The lower corner of bar 47 carries a bracket 35 on which the roller 34 is pivotally mounted at 37. The lower corner is biased by spring 55 to bring roller 34 into engagement between two walls of the front upright 38 of the standard 36. This prevents the pivoting or rotation of bar 47 until the roller 34 is released from the recess in the front leg 38 of the standard 36. Located just above the horizontal axis of bar 47 is a stop member 57 adapted to engage the bumper 56 which is carried by the tray support element 44.

The pin 53 also carries the tray 31 and the U-shaped tray support element 44. The depending legs of the support element 44 each comprise a V-shaped portion with its vertex terminating in an aperture in which the pin 39 is located. The pin 39 extends through the vertical legs 38 of the standard 36 so that the tray 31 and support element 44 are rotatable about pin 39 responsive to the movement or rotation of the pivot bar 47 in a vertical plane and transmitted through the pin 53.

Now as the tray comes adjacent the location at which the package is to be deposited, the solenoid 66 corresponding to that station and located on the opposite side of the conveyor is energized. It rotates the cam bar 62 so that the cam element 61 is disposed in the path of roller 42 also on the side opposite to that which it is desired to deposit the package 28.

As seen in FIG. 7 the roller 42 strikes the cam element 61 and on reaching the inclined portion thereof is forced backwards while the carriage 30 continues its forward movement. This brings the roller 34 from the recess in the standard 36 and now as the carriage moves forward the roller 42 pivots its support bar 47 as the roller moves up the incline of the cam 61. As roller 42 moves toward the pin 53, the tray support element 44 and the tray 31 also pivot about pin 39 to deposit the package 28, while the bumper 59 carried by the legs 38 provides a shock absorbing action.

The restoring cams 95 are located on opposite sides of the carriage and at a desired location along the conveyor for the purpose of restoring the tray 31 to its unoperated condition. Thus, as seen in FIG. 4 wherein the pivoted tray and rollers 42 are shown in phantom lines, the left roller 42 contacts the cam 95. As the roller 42 moves up the incline the pivot bar 47, the tray support element 44, the pin 55 and the tray 41 are rotated back to their normal position. As this occurs, the roller 34 comes abreast or in alignment with the recess on the front leg 38 of the standard 36. Spring 55 biases the roller 34 into the recess and the tray 31 is now locked in its horizontal position where it is ready to receive another package as it passes station 21.

Referring now to FIG. 9 of the drawings, there will be seen the electrical circuitry whereby respective ones of the solenoids 66 are energized at different stations under control of the keyboard at 200. The power is supplied from a conventional 115 volt source whose opposite terminals are indicated at A and B. The keyboard 200 comprises a series of keys T1–T6 corresponding to different tens digits and U1–U6 corresponding to the various units digits. These keys are momentarily operated by the attendant at 27 in accordance with the desired destination of a package being transported along the conveyor system to render effective corresponding memory timers. Thus, for example, keys T1 and U1 are operated, if the station to which the package is destined corresponds to 11 increments on the conveyor system, and each operates a corresponding relay RT1 and RU1 which controls the respective memory timer solenoid ST1 and SU1 at contacts such as RT1' and RU1'.

Thus relays RU1–RU6 and RT1–RT6 each enables the respective ball solenoid SU1–SU6 and ST1–ST6 associated with a respective memory timer to control the deposit of the balls in the respective channels in synchronism with the movement of the carriages. Thus contacts $x$ are arranged in any well known manner to momentarily open just before any ball can be stepped by movement of the conveyor. This ensures that the selected solenoid cannot operate until the conveyor has completed its particular advance of one increment. Lamp L signals this condition. The relays RT1 and RU1 are operated therefore responsive to the proper operation of the respective tens and units keys and these relays lock operated at contacts RT1' and RU1' respectively. The operation of contacts $x$ thereafter is immaterial, as the relays RT1 and RU1 energize the respective solenoids SU1 and ST1 through the respective locking contacts RU1' and RT1' and contacts $y$. A ball solenoid at each memory timer associated with SU1 and ST1 now drops into the respective channel. These balls may now be stepped by the conveyor in synchronism with the position of the carriage upon which the package is deposited. To prevent more than one ball from dropping into the channel responsive to one operation of any button, the contacts $y$ open momentarily thereafter, as the chain moves, to release each operated solenoid and prevent other balls from dropping into the channel. As the conveyor moves the carriages 30 and 30a along the route, the conveyor now steps each deposited ball once along its track or channel for each incremental advance of the conveyor. As the ball in the channel associated with the timer RT1 passes its 11th–16th position it closes a respective one of contacts STA1–STF1 in each of those positions. As the ball in the units timer is stepped past positions 11, 21, 31, 41, 51 and 61, for example, it will close contacts SUA1–SUF1 respectively. Thus when each of the balls has been stepped to a position corresponding to eleven increments a circuit is completed through contacts STA1 and SUA1 for operating the tray relay 11 and individual to the desired station. Relay 11 operates the solenoid 66 at the station so that the carriage upon which the package is carried and which is now opposite that station deposits its package thereat. The memory timer contacts are adjustable with respect to ball channels, of course, so that the timers are interchangeable and also may be adjustably related to the station locations. The tray relay 11 is, of course, released as soon as the conveyor steps the respective balls to positions 12 to in turn release the solenoid 66.

Assuming, therefore, that a package 28 deposited on tray 30a is intended for postal zone 14 corresponding to station 70C. The operator at 27 operates a tens digit key T1 and a units digit key U4 to activate relays RT1 and RU4 respectively. Each locks operated and also operates the ball solenoids ST1 and SU4 which each now deposit a respective ball in the associated track or channel. The tens and units memory timer balls are thereafter stepped once responsive to each step of the conveyor. When the tens memory timer ball pases the position corresponding to 14 increments of the conveyor it closes contacts STD1. The ball may previously close contacts STA1–STD1 and thereafter also close contacts STF1, but this will have no effect as circuits to the tray relays will not be completed thereby unless a units ball is simultaneously closing a contact. The units memory timer ball simultaneously closes contacts SUA4 in its 14th position. When this occurs, a circuit is completed from terminal A to terminal B through a tray trip relay 14 (not shown) and that relay completes a circuit to the solenoid 66 at station 70C. Solenoid 66 pivots the cam 61 into the path of one roller 42 on tray 30a.

Thus tray 30a has now taken a corresponding number of steps and is abreast of the location 70C corresponding to the postal zone 14. The roller 42 therefore engages cam 60 to swing the pivot bar 47 and the tray 31 to deposit the package destined for that station. Thereafter as the other roller 42 is brought into engagement with cam 95 as the carriage 30 approaches the end of the conveyor, the pivot bar 47 and tray 31 are pivoted into their normal position and the carriage is ready to receive another package.

If in the meantime another package is placed on another tray for deposit at station 44, for example, and corresponding buttons operated, the solenoids ST4 and SU4 are operated. Solenoid ST4 now drops its first ball into the respective channel, while SU4 drops a second ball into the channel. When these balls are stepped to their 44th positions, contacts STD4 and SUD4 close for operating the respective tray solenoid 66. Thus packages may be selectively deposited as desired at the respective stations.

There has been described one embodiment of a conveyor arrangement for permitting the selective deposition of packages or articles at various stations together with electrical and other means for controlling the apparatus. However, the breadth of the invention is believed more accurately described in the following claim.

We claim:

In a conveyor apparatus which includes parallel tracks for supporting mechanisms to be conveyed, the improvement comprising carriage means for riding on said tracks, said carriage means including a standard means, wheels rotatably supported on said standard means and adapted to ride on said tracks, carriage trays, a pivotal bar extending vertically between each carriage tray and its associated standard means and providing a connection therebetween, a pivotal connection between said standard means and said pivotal bar whereby each tray is pivotally mounted on a standard means in a manner such that it is adapted to tilt about an axis parallel to said tracks to discharge goods on either side thereof, biasing means associated with each pivotal bar at the point of its connection with a carriage tray, a recess formed in each standard means, a rotatable member on each pivotal bar adapted to be received in said recesses, said biasing means normally urging said rotatable member in the direction of said recess whereby each pivotal bar and the carriage tray supported thereon can be locked against tilting movement when the associated rotatable member is received in said recess, a plurality of tilting means for said carriage trays positioned in the path of said trays at a plurality of stations along the conveyor path, said tilting means comprising cam surfaces, means for rotating said tilting means whereby the cam surfaces slope upwardly in the direction of movement of said carriage trays along said track, rotatably mounted members fixed on each pivotal bar for engaging said tilting means when they are rotated into the path of movement of said carriage trays, engagement of said rotatably mounted members with said tilting means resulting in movement of the rotatable member on said pivotal bar out of said recess whereby the associated carriage tray is released for tilted movement and whereby said carriage trays are adapted to be tilted by discharging goods therefrom, and tray restoring means situated adjacent at least some of said tilting means, said restoring means comprising cam surfaces substantially corresponding to said first mentoned cam surfaces and being situated at a lower level with respect to said tracks than said first mentioned cam surfaces, whereby the rotatably mounted members of a tilted tray are adapted to engage said restoring means and ride up said restoring means to return the carriage tray to an untilted position.

References Cited in the file of this patent

UNITED STATES PATENTS

| | | |
|---|---|---|
| 1,528,227 | Spooner | Mar. 3, 1925 |
| 2,194,381 | Cadman | Mar. 19, 1940 |
| 2,227,778 | Fischbach | Jan. 7, 1941 |
| 2,344,596 | Carmina | Mar. 21, 1944 |
| 2,818,962 | Horth | Jan. 7, 1958 |
| 2,833,427 | James | May 6, 1958 |
| 2,969,137 | Baumann | Jan. 24, 1961 |
| 3,000,518 | Baumann | Sept. 19, 1961 |
| 3,034,665 | Speaker | May 15, 1962 |

FOREIGN PATENTS

| | | |
|---|---|---|
| 241,598 | Great Britain | Oct. 28, 1925 |